Figure 1:
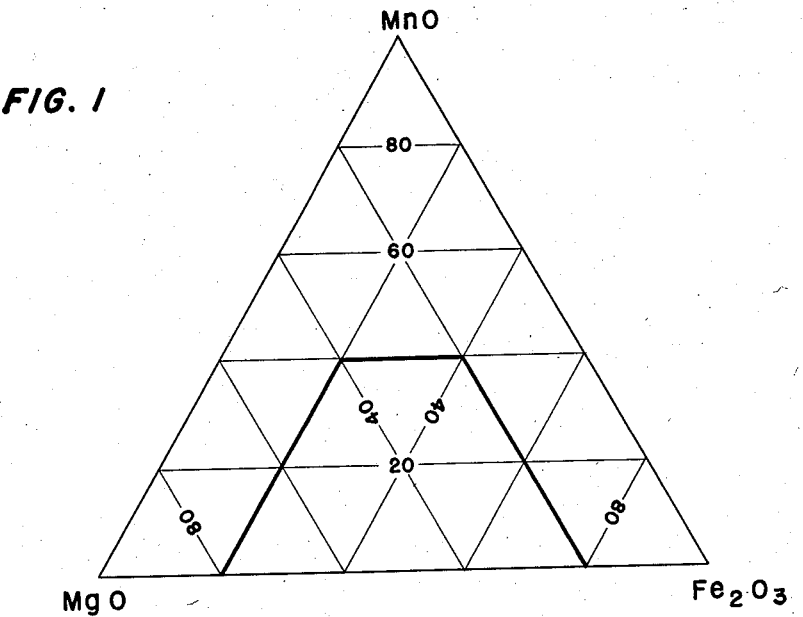

May 12, 1959  H. H. GREGER  2,886,530
PROCESS OF MANUFACTURING CERAMIC FERRITES
Filed July 19, 1955

INVENTOR
HERBERT H. GREGER

BY
ATTORNEY

United States Patent Office 2,886,530
Patented May 12, 1959

2,886,530

PROCESS OF MANUFACTURING CERAMIC FERRITES

Herbert Hans Greger, Rockville, Md.

Application July 19, 1955, Serial No. 523,132

2 Claims. (Cl. 252—62.5)

(Granted under Title 35, U.S. Code (1952), sec. 266)

The invention described herein may be manufactured and used by or for the Government of the United States of America for governmental purposes without the payment of any royalties thereon or therefor.

This invention relates to improvements in the method or process of manufacturing ceramic products such as ferrites adapted for use in microwave circuits. In particular, it relates to a method or process of manufacturing ceramic ferrites in which a nonaqueous medium is used as compounding and plasticizing agent for non-plastic raw materials, thereby making it possible to closely control the manufacture of these ceramic ferrites.

Ferrites in the ceramic form have been found to possess electrical and magnetic properties which make them extremely useful as elements in electronic circuits, particularly microwave circuits. These properties and some applications thereof have been described in the proceedings of the I.R.E., volume 41, No. 1, January 1953, at pages 87 and following, and in other publications referred to therein. Two of the more important properties are insertion loss and the rotation of the plane of polarization of microwaves when propagated through a waveguide containing a ferrite under the influence of a magnetic field. One important application of these properties is the device known as the microwave switch which is disclosed in U.S. Patent No. 2,644,930, issued July 7, 1953, to C. H. Luhrs et al.

It has been found, however, that ferrites having the desired magnetic and electrical properties at microwave frequencies are difficult to reproduce. This irreproducibility is attributable in part to the high shrinkage and the unpredictability of the final density, grain size and structure, all of which affect other physical properties of these ceramic products, as noted above, and may in turn control the electrical and magnetic properties thereof.

Still another object of the invention is the provision of a process of manufacturing ferrites having consistently satisfactory magnetic and electrical properties.

Briefly, the present invention resides in a process for compounding raw materials, such as oxides, and forming them into a plastic mixture by the use of a suitable organic solvent, for example, a liquid hydrocarbon. The raw materials are compounded in the presence of the liquid hydrocarbon, then filtered and dried, removing the excess oil, and then rewetted with the precise amount of the liquid hydrocarbon required to give the desired plasticity. To cause the particles to hold the solvent, and thereby achieve a very satisfactory degree of plasticity, a wetting agent, such as a fatty acid, is added which causes the particle surfaces to have lipophilic properties. The imparting of lipophilic properties to the surfaces of dry ceramic raw materials by the use of a non-aqueous fatty acid is considered to be an important feature of this invention. The wetting agent acts to bind enough of the plasticizing solvent to the surfaces of the particles to impart the desired plasticity to the mixture. The mixture is then worked and formed into the desired shapes and fired to provide the final product.

Figure 2:
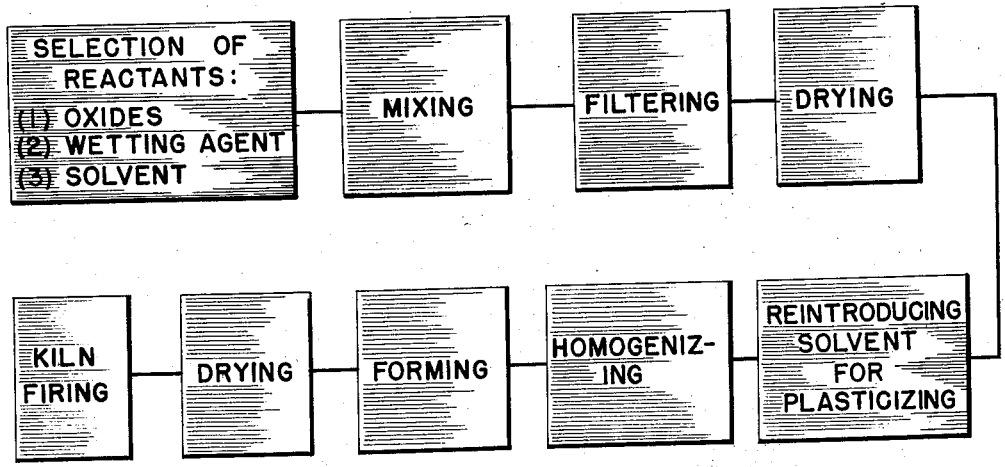

Other objects and many of the attendant advantages of this invention will be readily appreciated as the same becomes better understood by reference to the following detailed description and the accompanying drawing wherein Fig. 1 is a graphical representation of a three component system, such as may be used in the present invention; and, Fig. 2 is a flow diagram illustrating the method of the present invention.

Generally speaking, while a three component system is shown in Fig. 1, systems having two or more components may be used. In the example in Fig. 1, the system is composed of ferric oxide, magnesium oxide and manganese oxide. The portion within the heavy lines in Fig. 1 merely indicates the percentages of the compositions which are of preferred interest, and as will be understood, many other components may be employed in different amounts. It will be understood also that some of the steps of the flow diagram of Fig. 2 can be altered, for example, the step of filtration can be replaced by distillation, if desired.

In the preferred embodiment of the present invention, the particular materials to be employed are selected in their raw or uncombined form, that is, in a state where ferrite has not been formed by heating to the temperature of reaction. As can be seen from the example given in triaxial diagram of Fig. 1, a mixture composed of the oxides of iron ($Fe_2O_3$), magnesium (MgO) and manganese (MnO) in percentages ranging from 20% to 80% of each of the iron oxide and magnesium oxide, and from 0 to 40% of manganese oxide has been found preferable for the purposes of this invention. It is also to be understood that the individual oxides need not be in an uncalcined raw state as some of these materials undergo a controlled heating during their production. On the other hand the raw materials may have any suitable chemical state or particle size and other pertinent characteristic, provided they are capable of reacting at their surfaces with an organic acid used as a wetting agent so that the surfaces have lipophilic properties. The upper particle size limit, as in many other ceramic processing methods, is approximately 325 mesh or about 40 microns, but there is no lower size limit for the particles which may be as small as 0.1 micron and smaller.

The correct amounts of other reactants, namely, the wetting agent and the solvent, are also selected. While any wetting agent which will cause the oxides of Fig. 1 to have an affinity for oil (lipophilic properties) may be employed, it has been determined that a fatty acid of the group having from 4 to 18 carbon atoms is especially satisfactory. The properties and the quantity of the fatty acid used may vary, depending upon the composition, chemical state, and other characteristics of the oxide mixture; however, it has been found that from 2% to 10% by weight of a fatty acid, such as myristic acid, is satisfactory when the weight of the oxide mixture is set at 100%, depending somewhat on particle size distribution and chemical nature of the ceramic oxide.

As stated hereinabove, according to the teachings of the present invention, water, which had formerly been used in the mixing and plasticizing steps in the process of manufacturing ceramics, is replaced entirely by an organic solvent. Any inexpensive and readily available liquid hydrocarbon having a low boiling point, such as kerosene, Varsol and the like is satisfactory for this purpose. A volatile solvent is employed so that any excess is readily removed on heating or firing of the mixture. The amount of the organic solvent required is the correct amount for converting the lipophilic oxides into an easily extrudable plastic mass. The oxides are basic and react with the acid thereby binding acid molecules on the surface of the oxides and causing them to retain a solvent, remaining plastic.

The oxides, the wetting agent, and the solvent are thoroughly mixed in a suitable apparatus, such as a steel ball mill. Then, the solvent is removed by filtering or distillation and the oxides are dried. The oxide mixture is then rewetted with solvent and homogenized by mixing in a heavy duty mechanical mixer with the precise amount of oil required to permit forming, for example, by extrusion. The homogenizing is continued as long as may be required to prepare a readily extrudable plastic mass. This plastic mass is loaded into an extruder or other forming apparatus, such as a die press, and formed into the desired shape.

The pieces thus formed are then dried and fired in an accurately controlled kiln at temperatures between approximately 1200° C. and 1450° C. for several hours. After kiln firing the pieces may be redimensioned by grinding, or otherwise working, and then further dried at relatively low temperatures if necessary.

In a specific example, a 1000 gram batch was prepared having proportions of 1 gram molecular weight iron oxide ($Fe_2O_3$), 1 gram molecular weight magnesium oxide (MgO), and 0.5 gram molecular weight manganese oxide (MnO). This mixture was loaded into a steel ball mill charged with ¾″ steel balls. Myristic acid in the amount of 4% by weight was added, as a wetting agent. The oxides were mixed with enough kerosene to form a thin slurry for two hours or more in the ball mill. The excess kerosene was filtered off by a pressure filter and the filter cake was dried at about 250° F.

The dried mass was then weighed and kerosene in the amount of 11.5% by weight was added to the mass. The mixture was homogenized in a muller mixer such as a Lancaster or Simpson for about 5 minutes. The plastic mass thus formed was loaded into the barrel of a heavy duty piston extruder. After charging the barrel with the plastic mass and plugging the die of the extruder, the barrel was evacuated, deairing the mixture, and the forward motion of the piston was started. It will be understood, of course, that dies may be selected to give ribbons, rods, or tubes of the desired dimensions. The plug placed in the extruding die was pushed out after consolidation of the material and the extrusion begun.

The ribbons or round rods were extruded into troughs which held them straight while drying. The rods were then air dried for a period of from several hours to one or more days, as required.

The rods were then placed on slabs of 99% alumina in a program controlled electric kiln. Then the temperature was increased by 10 to 20° C. per hour until 1350° C. was reached. This last temperature was held for four hours. The kiln was then cooled at a programmed rate of 20° C. per hour to room temperature.

Necessary redimensioning was done by grinding and the ferrites were then dried at 250° F. for several hours.

The advantage of this process resides in the development of plasticity, in non-plastic oxide mixtures, of such low internal friction that extrusions of exceptionally stiff bodies can be made. It is believed that development of plasticity by an oil phase is responsible for this favorable condition. Very stiff mixtures have a minimum of oil. As a consequence the shapes made from such bodies have a high density to start with and develop full density in the kiln fire, usually at lower temperature than bodies of a higher initial porosity. This is of importance for the control of properties as density, crystal size, firing temperature and other factors affect the electrical properties in the finished product. Ferrites having very high values of Faraday rotation and very low losses due to microwave absorption have been obtained. The combination of a low kiln firing temperature with the smallest possible crystal size and full density have been found desirable in some cases for the development of certain electrical and magnetic characteristics in a ferrite material. The same conditions have also a bearing on good reproducibility of the properties of the ceramic material.

As has been pointed out hereinabove, the use of plasticization by light hydrocarbon oils eliminates the hazards due to hydration of some of the oxides, which may result in excessive shrinkage, cracked and warped pieces and difficulties in reproducing properties.

While the specific example described employs the oxides of iron, manganese and magnesium, other oxides may be used in place of the MgO and MnO. These include oxides of zinc, cadmium, copper, nickel, cobalt, chromium and aluminum oxide calcined at low temperatures. In addition aluminum hydroxide and certain carbonates such as those of barium, strontium, calcium, lithium, nickel, cobalt, zinc, cadmium or copper may be substituted.

I claim:

1. In a method of reproducibly manufacturing ferritic ceramic products with corresponding electric and magnetic properties from dry materials, the steps of mixing a batch of particles consisting essentially of 20–80% $Fe_2O_3$, 20–80% MgO, and 0–40% MnO with a volatile liquid hydrocarbon solvent and with a fatty acid containing 4–18 carbon atoms to form a slurry with the surfaces of the particles having lipophilic properties, the acid being from 2–10% of the weight of the batch, removing excess solvent to dry the resulting product, homogenizing the resulting product with a small amount of said solvent sufficient to make the last said product into a shapable plastic mass, homogenizing the plastic mass, forming the homogenized plastic mass into a shape, and firing said shape at a temperature of approximately 1200°–1450° C. to solidify it.

2. In a method as defined in claim 1 in which said acid is myristic acid.

References Cited in the file of this patent

UNITED STATES PATENTS

| 1,795,011 | Cross | Mar. 3, 1931 |
| 2,388,446 | Straight | Nov. 6, 1945 |
| 2,388,447 | Straight | Nov. 6, 1945 |
| 2,463,994 | Nicols et al. | Mar. 8, 1949 |

FOREIGN PATENTS

| 531,676 | Great Britain | Jan. 8, 1941 |
| 913,846 | France | Sept. 20, 1946 |
| 294,660 | Germany | 1916 |